(12) United States Patent
Gräeber (10) Patent No.: US 8,454,876 B2
(45) Date of Patent: Jun. 4, 2013

(54) METHOD FOR MANUFACTURING AN FC PARISON OUT OF A LAMINATE WITH AT LEAST TWO PREPREG LAYERS AS WELL AS A MANUFACTURING DEVICE FOR SUCH A METHOD

(75) Inventor: Rainer Gräeber, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 273 days.

(21) Appl. No.: 12/746,240

(22) PCT Filed: Dec. 8, 2008

(86) PCT No.: PCT/EP2008/010398
§ 371 (c)(1),
(2), (4) Date: Jun. 4, 2010

(87) PCT Pub. No.: WO2009/071331
PCT Pub. Date: Jun. 11, 2009

(65) Prior Publication Data
US 2010/0263789 A1     Oct. 21, 2010

Related U.S. Application Data

(60) Provisional application No. 60/992,740, filed on Dec. 6, 2007.

(30) Foreign Application Priority Data

Dec. 6, 2007  (DE) .......................... 10 2007 058 727

(51) Int. Cl.
*B29C 70/30*     (2006.01)
(52) U.S. Cl.
USPC ............................ 264/257; 264/258; 264/339
(58) Field of Classification Search
USPC ......................... 264/257, 258, 339
See application file for complete search history.

(56) References Cited

U.S. PATENT DOCUMENTS

| 2,378,642 A | 6/1945 | Kopplin |
| 4,744,846 A | 5/1988 | Pflug |

(Continued)

FOREIGN PATENT DOCUMENTS

| DE | 4014549 A1 | 11/1990 |
| DE | 602005002300 T2 | 5/2008 |

(Continued)

OTHER PUBLICATIONS

International Preliminary Report on Patentability and Written Opinion for corresponding PCT application PCT/EP08/010398, dated Jul. 6, 2009.

(Continued)

*Primary Examiner* — James Sanders
(74) *Attorney, Agent, or Firm* — Matthew B. Dernier, Esq.; Gibson & Dernier LLP (57) ABSTRACT

Methods and apparatus for manufacturing an FC parison out of a laminate with at least two prepreg layers provide for: mounting at least a first edge section of the laminate in a first clamping device that can be moved relative to a fitting by means of a mechanical gearing, and a second edge section of the laminate lying opposite the first edge section in another clamping device, exerting a tensile stress via the first clamping device relative to the second clamping device over the area of the laminate lying between the clamping devices, while simultaneously moving the first clamping device in a direction directed away from the second clamping device up to a location where a rounded surface area of a fitting imparts to the laminate a curvature between the first clamping device and second clamping device as viewed in its longitudinal direction.

9 Claims, 6 Drawing Sheets

U.S. PATENT DOCUMENTS

| | | | |
|---|---|---|---|
| 4,800,111 A * | 1/1989 | Pflug et al. | 428/121 |
| 5,156,859 A | 10/1992 | Winkler | |
| 5,458,476 A * | 10/1995 | Medwin | 425/327 |
| 6,814,916 B2 | 11/2004 | Willden et al. | |
| 2004/0043196 A1 | 3/2004 | Willden et al. | |
| 2005/0053762 A1 | 3/2005 | Willden et al. | |
| 2006/0011289 A1 | 1/2006 | Suriano et al. | |

FOREIGN PATENT DOCUMENTS

| | | |
|---|---|---|
| EP | 1393875 A | 3/2004 |
| GB | 2061177 A | 5/1981 |
| WO | 9011882 A1 | 10/1990 |

OTHER PUBLICATIONS

International Search Report for corresponding PCT application PCT/EP08/010398, dated Jul. 6, 2009.

Chinese Office Action for corresponding Chinese Patent Application No. 200880119532.X, dated Oct. 23, 2012.

* cited by examiner

METHOD FOR MANUFACTURING AN FC PARISON OUT OF A LAMINATE WITH AT LEAST TWO PREPREG LAYERS AS WELL AS A MANUFACTURING DEVICE FOR SUCH A METHOD

CROSS REFERENCE TO RELATED APPLICATIONS

This application claims priority to PCT Application No. PCT/EP2008/010398, filed Dec. 8, 2008; which claims priority to German Patent Application No. DE 10 2007 058 727.0, filed Dec. 6, 2007, and claims the benefit to U.S. Provisional Patent Application No. 60/992,740, filed Dec. 6, 2007, the entire disclosures of which applications are hereby incorporated by reference.

BACKGROUND

The invention relates to a method for manufacturing an FC parison out of a laminate with at least two prepreg layers as well as a manufacturing device for deforming a semi-finished product in order to manufacture an FC component according to this method.

EP 1 393 875 A describes a forming method and mold for composites.

EP 1 393 875 A1 describes a compression molding device for molding a laminate structure. The compression molding device has a compression mold, which exhibits lateral end pieces made out of an elastic material that project away from a central section. During the compression deformation motion, the compression mold is moved against a counter-layer carrying a laminate structure, which is arranged on the counter-layer in such a way that the sections lying opposite each other extend beyond the counter-layer. The counter-layer is designed in such a way that the sections of the laminate structure extending beyond the counter-layer are pressed laterally down from the counter-layer during the compression molding motion of the compression mold. In the process, the elastic end pieces press together the curved areas of the laminate structure together in the direction of their thickness as they come about to the side of the counter-layer with increasing compression molding motion. During the compression molding motion, the contact surfaces of the end pieces slide over the surface of the laminate structure facing them.

U.S. Pat. No. 2,378,642 describes the manufacture of products made of natural fiber in a punch-type molding process, in which a first compression mold with a three-dimensional deformation contour is traversed against a second compression mold with a three-dimensional deformation contour designed to complement the deformation contour of the first compression mold. A compression molding process subjects a semi-finished fiber product inserted between the latter to three-dimensional deformation.

Known from DE 60 2005 002 300 T2 is a multi-stage method for manufacturing a structural composite carrier for airplanes.

Pre-impregnated fiber composites also referred to as prepregs and comprised of reinforcing fibers impregnated with a resin mixture while retaining a defined volumetric fiber content are used for a plurality of applications in the aerospace industry, motor vehicle construction and other areas. In order to increase the productivity, flexibility and efficiency of modern methods for manufacturing fiber composite components, it known from general prior art to form such prepregs in a hot forming process. The multi-layer prepreg laminate is here heated to a forming temperature to improve the flow characteristics of the resin mixture. The prepreg laminate is subsequently formed, wherein the laminate sheets (laminate layers) of the laminate glide one onto the other. For example, the laminate is hot formed in a single or double-diaphragm forming process, compression molding process or bending process. Diaphragm forming processes utilize a tool mold and flexible membrane (diaphragm), which deform the laminate through partial evacuation. The compression molding process takes place by compressing heated molds.

For example, a method and device for hot forming composite plates using a bending technique is known from WO 90/11882. This conventional bending device utilizes two bending plates, between which the laminate is arranged. During the forming process, a ram and roller tool are used to apply a tensile force in the direction of the free plate edge of the laminate to achieve a stress for the laminate layers.

The disadvantage to such methods is that the inter-laminate sliding of laminate layers, in particular given fiber composite components with a large leg length and component thickness, is associated with a high resistance, so that the inner laminate layers might end up flaking and bulging during component manufacture due to compressive stress on the interior radius of the component.

SUMMARY OF THE INVENTION

The object of the invention is to provide a method for manufacturing an FC parison out of a laminate with at least two prepreg layers, as well as a manufacturing device for deforming a semi-finished product to fabricate an FC component according to this method, wherein the inner laminate layers are prevented from flaking and warping in the forming process.

This object is achieved with the features as disclosed and described herein. Additional embodiments are also disclosed and described herein.

In particular, the invention provides a method for manufacturing an FC parison out of a laminate with a total of at least two dry fibrous tissue layers, which is held together with binders, and/or prepreg-layers, in which
  two laminate sections are mounted by clamping devices,
  the laminate is formed with the formation of a curvature, wherein
  the clamping forces in the first and second clamping devices are so high as to prevent the laminate layers from sliding relative to each other within the respective clamping device.

The method according to the invention or the manufacturing device according to the invention makes it possible to not stretch the laminate material out lengthwise, but rather to bend it, specifically in such a way that the laminate layers do not slide in relation to each other or slip by or over each other. This prevents sliding motions between the laminate layers in the forming process, and in particular the resultant damages to the surface of the laminate structure, and hence any impairment to the quality of the component to be manufactured. According to the invention, very little or no sliding motion takes places between the laminate and clamping device and/ or between laminate layers, in addition to which the curved area is open to the outside.

In particular, the invention provides a method for manufacturing an FC parison out of a laminate with a total of at least two dry fibrous tissue layers, which is held together with binders, and/or prepreg layers, with the following steps:
  Mounting (clamping) two edge sections lying opposite each other in a respective clamping device, Arranging the laminate on a fitting, and Exposing the laminate to a tensile stress, so that the contour of the fitting forms sectionally on the laminate.

In one embodiment of the invention, the method for manufacturing an FC parison generates the tensile stress in the laminate by moving the fitting transverse to the longitudinal direction of the laminate. To this end, the manufacturing device for implementing the method is provided with an actuator and mechanical gearing with which the fitting can be moved.

In another exemplary embodiment of the invention, the method according to the invention consists in particular of the following steps:

Mounting at least a first edge section of the laminate in a first clamping device that can be moved relative to a fitting by means of a mechanical gearing, and a second edge section of the laminate lying opposite the first edge section in another clamping device, wherein the first clamping device is situated on the other side of a rounded surface area of the fitting as viewed from the other clamping device, Exerting a tensile stress via the first clamping device relative to the second clamping device over the area of the laminate lying between the clamping devices, while simultaneously moving the first clamping device in a direction directed away from the second clamping device up to a location where the rounded surface area imparts to the laminate a curvature between the first clamping device and second clamping device as viewed in its longitudinal direction, wherein the clamping forces in the first and second clamping device are at least high enough to prevent the laminate layers from sliding relative to each other when the laminate within the respective clamping device is exposed to a prescribed maximum tensile stress.

The method according to the invention for manufacturing an FC parison out of a laminate with a total of at least two dry fibrous tissue layers held together with binders and/or prepreg layers can involve in particular the following steps:

Mounting at least a first edge section of the laminate in a first clamping device that can be moved relative to a fitting by means of a mechanical gearing, and a second edge section of the laminate lying opposite the first edge section in another clamping device, wherein the first clamping device is situated on the other side of a rounded surface area of the fitting as viewed from the other clamping device, Exerting a tensile stress via the first clamping device relative to the second clamping device over the area of the laminate lying between the clamping devices, wherein the first clamping device is moved in a predetermined direction, so that the rounded surface area of the fitting imparts to the laminate a curvature between the first clamping device and second clamping device as viewed in the longitudinal direction of the laminate, wherein the clamping forces in the first and second clamping device are at least high enough to prevent the laminate layers from sliding relative to each other.

It can here further be provided that the first clamping device is moved downward toward a first lateral surface of the fitting facing the first clamping device until the laminate sectionally abuts the first lateral surface. It can here further be provided that, before mounting the end section of the laminate (40) in the first clamping device (16), the first edge section (44, 45) be angled relative to the area (46, 47) situated next to the end section with the formation of a curved area lying between these areas, wherein the curvature causes the layers (Li, La) to be offset in relation to each other, and that the layers (Li, La) of the first end section are clamped together in the first clamping device (16) in this offset arrangement.

The method can provide that moving the first clamping device with the exertion of a tensile stress encompasses a downward movement of the first clamping device toward the lateral surface of the fitting, until the laminate sectionally abuts a first lateral surface facing the first clamping device. In addition, the angle by which the edge section lying in the first clamping device is rotated in relation to the area of the laminate lying in front of the first clamping device can be identical within a margin of ±10 degrees to the angle at which the second lateral surface runs relative to the supporting surface.

It can here also be provided that, before the first clamping device moves to deform the laminate during exposure to a tensile stress or, in a special exemplary embodiment, before the laminate is mounted in the clamping device, the laminate is arranged on a supporting surface of a fitting that has the supporting surface, the rounded surface area lying between, and the first lateral surface, which merge into each other viewed in the direction of the additional to the first clamping device.

Before the end section of the laminate is mounted in the first clamping device, it can be provided that the first end section is angled relative to the area lying next to the end section with the formation of a curved area lying between these areas, wherein the layers are offset relative to each other due to the curvature, and that the layers of the first end section in this offset arrangement are clamped together in the first clamping device. The length of the end section provided can be so small that the layer of the end area shifts without warping an interior layer.

In the method, the end section can be angled relative to the area lying next to the end section by means of a forming core.

The end section can be angled relative to the area lying next to the end section by turning the first clamping device around an axis, at which the section of the laminate taken up by the first clamping device is angled in its longitudinal direction in relation to the area lying outside of the first clamping device and in front of it. In particular a lower clamping force is here set, which makes it possible to shift the layers relative to each other due to the turning of the layers.

The laminate can be an annular segment of an annular parison laminate fabricated by winding a semi-finished product onto a winding mandrel.

In the method according to the invention for manufacturing an FC parison, the supporting surface and/or the lateral surface can have a flat design. Alternatively or additionally, the supporting surface and/or the first lateral surface can have a curved surface as viewed in the tensile direction. The supporting surface and/or the first lateral surface can also have a three-dimensional contour running transverse to the tensile direction, thereby imparting a three-dimensional deformation to the parison as viewed transverse to the tensile direction.

In addition, the method according to the invention for manufacturing an FC parison can provide that, when moving the first clamping device by means of another mechanical gearing, the second clamping device lying beyond another rounded surface area of the fitting as viewed from the first clamping device is also set in motion in a direction opposite the direction of motion of the first clamping device up to a location where the second rounded surface area of the fitting lying beyond the first surface area as viewed from the first clamping device imparts to the laminate a curvature between the first rounded surface area and the second clamping device as viewed in its longitudinal direction. The motion of the second clamping device can here take place simultaneously to the motion of the first clamping device. The additional clamping device can also encompass a downward motion of the additional clamping device toward a second lateral surface of the fitting lying opposite the first lateral surface and facing the second clamping device, until the laminate sectionally abuts the second lateral surface.

In this method for manufacturing an FC parison, it can be provided that, before mounting the second end section of the laminate in the second clamping device, the second end section is angled relative to the area situated next to the second end section with the formation of a curved area lying between these areas, wherein the curvature causes the layers to be offset in relation to each other, and that the layers of the end section are clamped together in the first clamping device in this offset arrangement.

It can here be provided that the length of the second end section is so small that the layer of the end section shifts without warping an interior layer. Further, the method can provide that the angle around the edge section lying in the second clamping device in relation to the area of the laminate lying in front of the first clamping device is identical within a margin of ±10 degrees to the angle at which the second lateral surface runs relative to the supporting surface. In the step where the second end section is angled relative to the area lying next to the end section, this angling process can take place with a forming core. In particular, the second end section can be angled relative to the area lying next to the end section by turning the second clamping device around an axis, at which the second end section of the laminate taken up by the second clamping device is angled in its longitudinal direction in relation to the area lying outside the second clamping device and in front of it.

The second lateral surface can at least sectionally have a flat design, or at least sectionally have a curved surface as viewed in the tensile direction. In addition, the supporting surface and/or the first lateral surface can have a three-dimensional contour running transverse to the tensile direction, thereby imparting a three-dimensional deformation to the parison as viewed transverse to the tensile direction.

Also provided according to the invention is a manufacturing device for deforming a semi-finished product in order to fabricate an FC component, which has:

A fitting retainer with a contour for abutting the semi-finished product, a first and second retaining device for respectively accommodating an end section of a laminate, which each have a clamping device for mounting the semi-finished product, a mechanical gearing that can be activated via an actuator and is coupled to the fitting, and can be used to move the fitting with a supporting contour transverse to the semi-finished product lying between the first retaining device and the second retaining device, so as to exert a predetermined tensile stress on the semi-finished product, wherein the supporting contour has a curvature, and the fitting is positioned in such a way that, when it moves transverse to the laminate progression, a curvature forms in the laminate.

Another exemplary embodiment of the invention provides a manufacturing device for deforming a semi-finished product in order to fabricate an FC component, having:

A fitting retainer for accommodating a fitting for forming the semi-finished product;

a first and second retaining device for respectively accommodating an edge area of a laminate, which each have a clamping device for mounting the semi-finished product, a mechanical gearing that can be activated by means of an actuator, and to which the first retaining device is coupled, wherein the mechanical gearing is designed in such a way that the first retaining device can apply a predetermined tensile stress opposite the direction pointing to the second retaining device, and simultaneously execute a motion relative to the fitting retainer.

It can further be provided that the mechanical gearing be coupled with a driving device, which can be activated by means of the actuator, and is coupled with the first retaining device, wherein the mechanical gearing and driving device are configured in such a way that the first retaining device can apply a predetermined tensile stress opposite the direction pointing to the second retaining device, and simultaneously execute a motion relative to the fitting retainer.

The motion performed by the mechanical gearing can here be situated in a plane. The driving device can be suited for exerting a tensile stress of a predetermined magnitude on the laminate during the motion executed by the mechanical gearing. The tensile stress can be applied via a spring arrangement that is coupled in particular with the driving device, which ensures that a minimum tensile stress is maintained during the forming motion. The mechanical gearing can also be configured in such a way as to make the path of motion adjustable. The path of motion can here be arced. Further, the first retaining device can have a rotational device with which the first retaining device can be turned around an axis running transverse to the connection between the first and second retaining device.

In addition, it can be provided that the second retaining device be coupled with a mechanical gearing, which can be activated with an actuator, wherein the mechanical gearing and driving device are designed in such a way that the second retaining device can apply a predetermined tensile stress opposite the direction pointing to the first retaining device, and simultaneously execute a motion relative to the fitting retainer. It can further be provided that the motion of the second retaining device executed by the mechanical gearing lies in a plane.

In particular, the driving device of the second retaining device can be designed in such a way making it suitable for exerting a tensile stress of a predetermined magnitude on the laminate.

The driving device of the second retaining device can also have a spring arrangement, with which a tensile stress is applied opposite the first retaining device, so that a minimum tensile stress is maintained during the forming process. The mechanical gearing of the second retaining device can be designed in such a way that makes the path of motion adjustable. In particular, it can be provided that the manufacturing device is designed in such a way as to exert a tensile stress in the direction of the section lying bare in front of the respective clamping device or retaining device, wherein a prescribed path of motion is simultaneously executed. In general, the path of motion of the second retaining device can be arced. Further, the second retaining device can have a rotational device with which the second retaining device can be turned around an axis running transverse to the connection between the first and second retaining device.

The actuator and mechanical gearing with the aforementioned alternatives can analogously also be provided for moving the fitting.

BRIEF DESCRIPTION OF THE DRAWINGS

Exemplary embodiments of the invention will be described below based on the attached figures. Shown on:

FIG. 3 is a side view of an embodiment of the forming device according to the invention for manufacturing an FC component, in which a laminate formed out of the parison on FIG. 2 has been inserted, wherein FIG. 3 depicts the state of the device and laminate before forming;

DETAILED DESCRIPTION OF THE INVENTION

Figure 3:
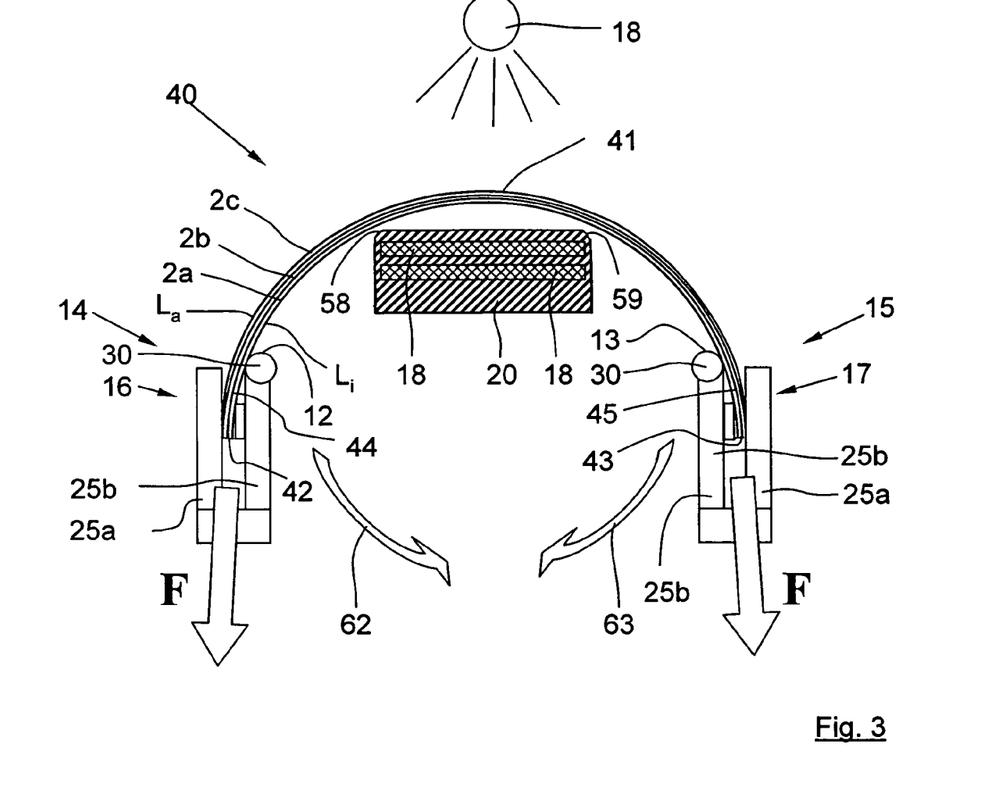
Figure 4:
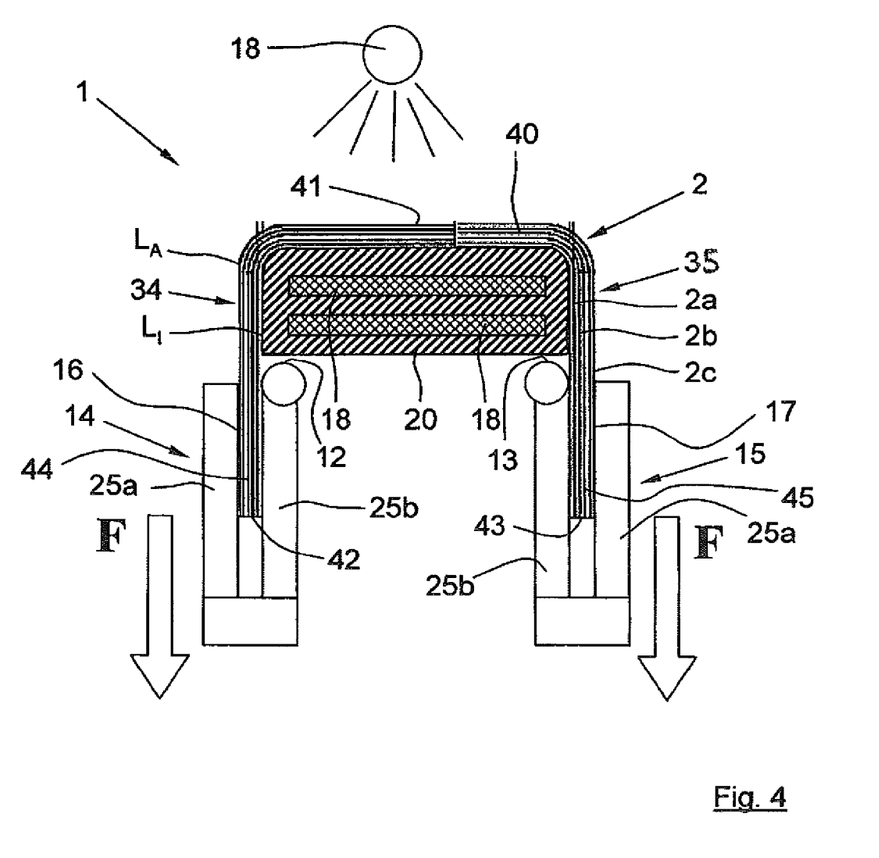
FIG. 4 is the embodiment of the forming device according to the invention based on FIG. 3 in the same side view with the laminate after forming.
Figure 7:
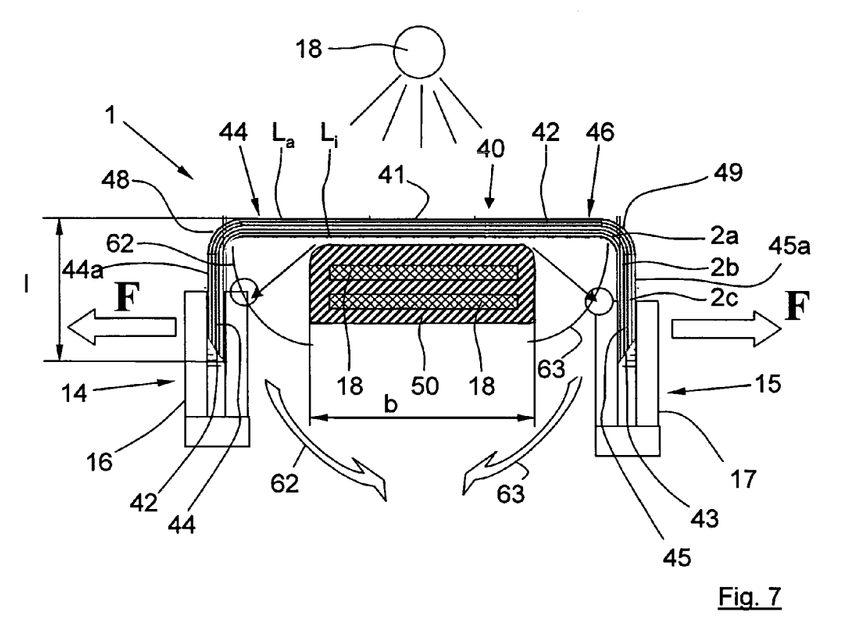
FIG. 7 is a side view of an embodiment of the forming device according to the invention with the parison from FIG. 6 inserted prior to the forming process, and on FIG. 8 is a side view of the forming device according to FIG. 7 with inserted parison after the forming process.
Figure 8:
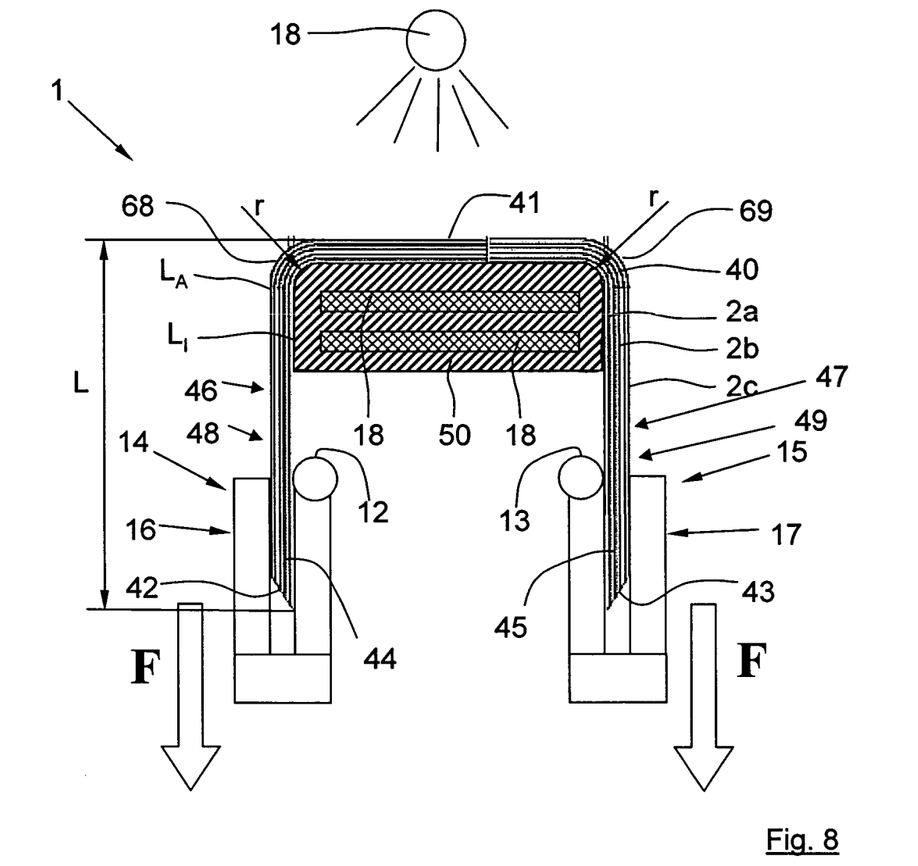

In the method according to the invention for manufacturing a fiber composite (FC) parison 1 as depicted on FIGS. 4 and 8 in a form to be manufactured, the motion of a clamping device is used to angle a mounted end section, 46 via abutment to a rounded surface area 36, 37 during exposure to a tensile stress transverse to the rotational axis of the clamping device (FIG. 3 as well as 7 and 8).

As an option, this procedural step can be preceded in order to form an initial parison in an initial state 2 by pre-curving the laminate, in particular in the environment of a curvature area 68, 69 (FIG. 8) to be provided for the component to be fabricated, as shown by exemplary embodiments on FIGS. 1, 2 and 5, 6. In this case, a laminate 4, 42 having a majority or plurality of laminate sheets or layers 2a, 2b, 2c is deformed, e.g., into a state depicted on FIG. 2 or 6 and 7.

The initial laminate used to manufacture an FC parison according to the invention is a laminate consisting of at least two dry fibrous tissue layers held together with binders and/or prepreg layers. In this sense, reference is made in abbreviated form to laminates comprised of layers.

The deformation can involve forming, and in addition can in particular also be a three-dimensional deformation of layers in the initial laminate.

Figure 1:
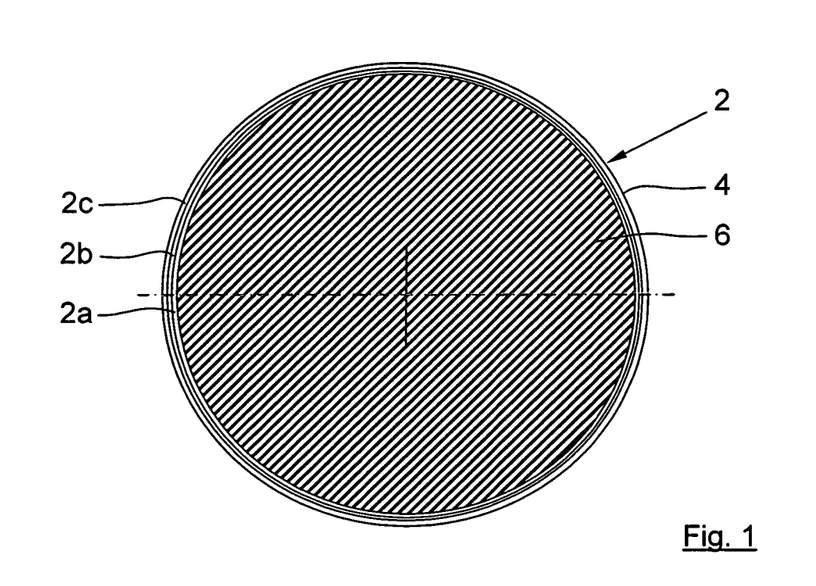
FIG. 1 a side view of a winding mandrel with wound laminate having several layers as an optional first step in the method according to the invention for manufacturing a parison for a fiber composite (FC) component based on an exemplary embodiment according to the invention.
Figure 2:
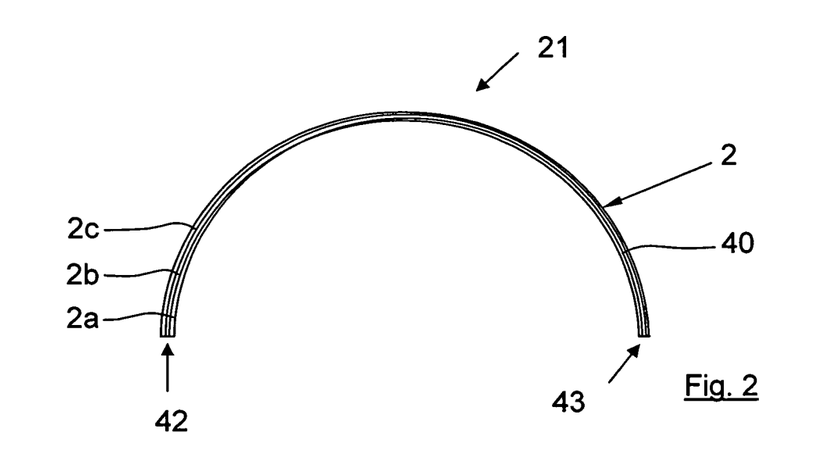
FIG. 2 is a side view of a segment of the parison wound according to FIG. 1, which can be used for ensuing steps of the method according to the invention.
Figure 5:
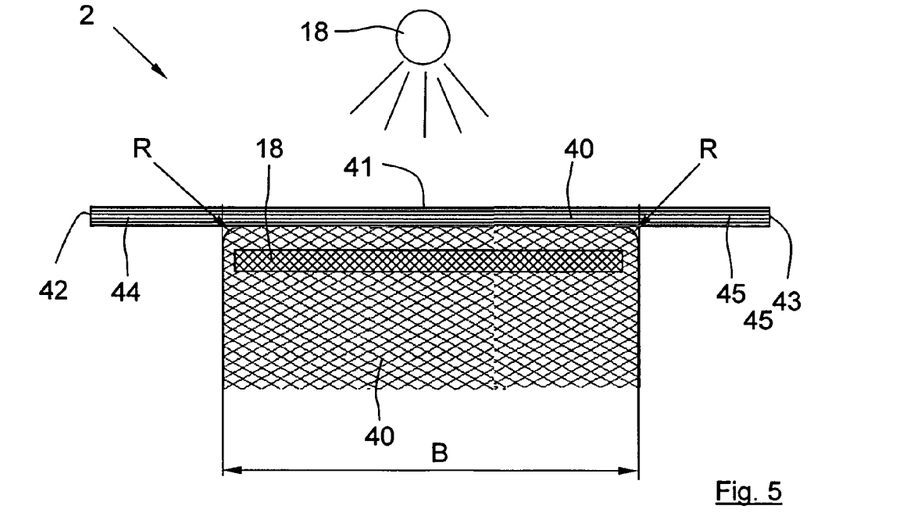
FIG. 5 is an alternative method to the method for forming the laminate shown on FIGS. 1 and 2, which involves a first step, wherein a side view of a preform device with applied laminate is depicted.
Figure 6:
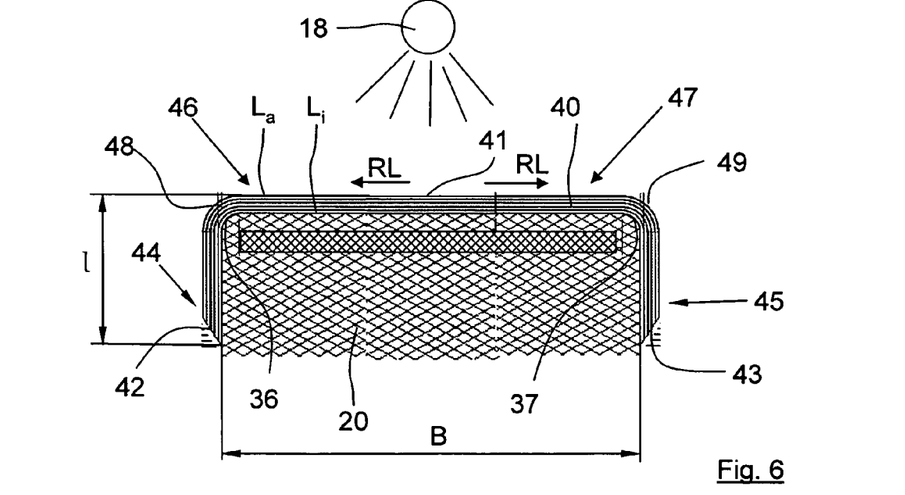
FIG. 6 is a side view of the perform device according to FIG. 5 after the parison has been formed.

Such an initial parison can optionally be formed in an initial state 2 using various methods, one of which is depicted on FIGS. 1 and 2, and another on FIGS. 5 and 6.

In a first embodiment of the method according to the invention for forming an initial parison for use in the manufacturing device according to the invention, the laminate 4 used for the subsequent forming steps is optionally fabricated in a winding process (FIG. 1), in which a fiber composite, for example, is reeled onto a winding mandrel 6, which in particular can have a circular cross section (FIG. 1). The winding process can take place in various ways. It can be provided that an endless fiber, strand or band initially is guided through an impregnation path, wetted with the matrix substance, and then reeled onto the winding mandrel 6. As an alternative, prepreg bands are wound, and then cured. Further, it is possible to wind the mandrel with unsaturated composites that are subsequently saturated in a resin injection procedure to form the laminate. The layer sequence and number of applied laminate sheets 2a, 2b, and 2c depends on the requirements placed on the component to be fabricated. In particular, the fiber progression is adjusted to the load path of the component, thereby enabling the manufacture of light, high-strength structures. The winding process, and hence the fabrication of the parison 4, can largely be automated.

FIG. 2 shows a side view of a segment of the parison 4 from FIG. 1 wound as depicted on FIG. 1, and the annular parison 2 fabricated in the winding process can be separated after winding into several, and preferably two, half-rings each forming a laminate 4, and removed from the winding mandrel 6. Because a laminate ring segment is used as the initial parison for the forming process according to FIG. 3, the end sections, 45 are turned as viewed in the longitudinal direction of the curvature relative to a central area 21 in the orientation of their longitudinal directions.

As an alternative, the parison laminate can also be formed as depicted on FIG. 5 or 6, or in some other way.

It can here be provided that at least a first end section 44, 45 is angled relative to an area 46, 47, which is situated next to this end section 44, 45 toward the central area 41 of the surface of the laminate, so that an area lying between the end section 46 or 47 is angled with the formation of a curved area 48 or 49 situated in between these areas.

In the example shown on FIGS. 5 and 6, the curvature 48, 49 is introduced at edge lines or edge areas of a tool mold 20. In particular, the parison laminate 3 can have rounded surface areas 36, 37 to generate the curvature 48, 49.

The cross sectional shape of the tool mold 20 can be provided based on this application and the required shape of parison 3. FIGS. 5 and 6 depict a roughly rectangular cross sectional shape. For example, the tool mold 20 could also have a trapezoidal, triangular or hexagonal cross sectional shape.

Given the corresponding abutment of the laminate against them, the rounded edges or surface areas 36 or 37 form the curved areas 48 or 49. This step can also be provided with two second end sections lying opposite the latter as viewed in a longitudinal direction or machining direction, as shown on FIGS. 5 and 6. Since the respective end section is not mounted or clamped in the cross sectional direction in this step, the layers can shift relative to each other in terms of their longitudinal direction in accordance with their respective radius in the curved area 48 or 49.

After mounting an end section in a clamping device, the formation of an initial parison accompanied by an angling of the end section in relation to the area lying next to the end section can also take place by turning the respective clamping device around an axis at which the section of the laminate taken up by the first clamping device is angled in its longitudinal direction relative to the area lying outside the first clamping device and in front of it, wherein a lower, i.e., maximum permissible clamping power is set, which makes it possible to shift the layers relative to each other by turning them.

As a result of this optional formation of an initial parison, at least one bare end section 46 or 47 with layers offset in relation to an initial layer with a different curvature and in particular having a flat progression relative to each other at least in these areas is then mounted or clamped in such a way that the layers of the end section can no longer shift relative to each other in the course of subsequent procedural steps. The mentioned steps for forming an initial parison already having a curvature further reduces the danger of bulging, warping or creasing in the curved area 48 or 49 on the interior layers Li, i.e., the layers with a smaller diameter in relation to more outlying layers La with larger radii in the curved area. To this end, during the process of deformation according to F*ig*.5 and 6, the length of the respective end section 46 or 47 as viewed in the longitudinal direction RL is preferably not to exceed a predetermined maximum level as a function of the material of the used prepreg layers starting at which layers lying on the inside start to warp or bulge relative to outer layers in the respective curved area 48 or 49. Because a leg with a shorter length 1 (FIG. 6) is initially formed on one side of the laminate via angling, and a leg of the component to be manufactured with a longer length L is fabricated out of this leg in the ensuing step (FIG. 8) by means of the clamping device moved on the laminate via exposure to a tensile stress, the following is achieved: In the first step, the layers are shifted relative to each other over a length at which the angling the leg does not yet cause any warping or bulging of interior layers; and in the second step, the shifting of the layers relative to each other is distributed over the longer leg length L of the component to be manufactured. As long as the selected difference in lengths L and 1 is not too great, the inner layers of the laminate again do not experience any warping or bulging.

A parison segment 2 according to FIG. 2 can also be used as the initial parison for the method as described on FIGS. 5 and 6.

The parison can be formed in a hot forming process, so as to form the protruding end sections 44, 45 of the laminate 2 depicted on FIG. 5 in a hot forming process. For example, the plate-shaped laminate 2 an be hot formed in a single or double diaphragm forming process. In this case, the layers 2*a*, 2*b*, 2*c* of the laminate 2 glide onto each other, wherein the displacements run out at the leg ends 42, 43, resulting in the "book effect" shown on FIG. 6 at the laminate edge 42, 43 of the roughly U-shaped parison 40. In this diaphragm forming process, a differentiation is made between the single (SD) and double (DD) diaphragm process with one diaphragm or two diaphragms. The respective diaphragms consist of a flexible membrane (not shown), for example a TYGAVAC LRB100 or Mosites membrane, which separates a room evacuated by vacuum from the atmosphere. In the SD process, the forming core 40 is first placed on a vacuum table. The laminate 2 is then positioned on the tool mold 20 in the desired position, and warmed up with a heater 18 (see FIG. 5). The laminate 2 is heated via continued convective thermal irradiation from above. In both the SD and DD processes, the heat is here initially transferred via thermal irradiation to the upper diaphragm, and from there via thermal conduction through the membrane and into the clutch. Ceramic radiators, incandescent bulbs or IR radiators are preferably used as the heat source. In addition, the forming table can be heated from below, i.e., from the tool mold 20, e.g., via thermal radiators, for example IR radiators. The diaphragm is then placed on the entire structure and joined airtight with the vacuum table. A partial vacuum is subsequently generated via a vacuum line between the diaphragm and vacuum table, so that the ambient pressure presses the laminate 2 against the tool mold 20 and forms it in this way.

The double diaphragm process differs from the single diaphragm process essentially in that the laminate 2 is positioned between two membranes and vacuum-evacuated. In this way, the individual layers of the laminate 2 are already fixed in position relative to each other. The entire package comprised of the two diaphragms and clutch is then heated and formed, as already described for the SD process.

In another exemplary embodiment of the invention, the optionally provided hot forming of the parison 4 can be performed in a compression or bending process (not shown). In a compression process to form the parison 4, the laminate 2 is placed between a negative and positive tool and formed during exposure to temperature. To manufacture the parison 4 in a bending process, the edge of a laminate 2 lying on a table is folded over. To this end, use is made of plates that envelop the laminate at the top and bottom sides without exerting strong pressure. An end section of the laminate 2 is then bent by pivoting the plates around the edge.

According to the invention, the pre-curved or non-pre-curved parison is angled by the motion of a clamping device 16, 17, in which at least one end section 46 or 47 is mounted, in particular an area 46 or 47 lying inside or in front of the clamping device as viewed in the longitudinal direction, i.e., toward the central area, through contact with a first rounded surface area 58 or 59 of a fitting 50, wherein the clamping device exerts a tensile stress on the laminate transverse to the rotational axis or path of motion of the clamping device (FIG. 3 as well as 7 and 8).

The at least one clamping device 16, 17 is preferably integrated into a retaining device 14 or 15, in which the respective end section of the laminate can be accommodated. The clamping device 16, 17 preferably has laminate clamps with two clamp faces 25*a*, 25*b*, which can exert a force F on the laminate or laminate parison 40 in the longitudinal direction of the laminate. If necessary, the clamping device 16, 17 can hold the end sections 44, 45 of the laminate 40 by means of clamps in such a way that the layers 2*a*, 2*b*, and 2*c* in the area of the end sections 44, 45 cannot move relative to each other, in particular in the longitudinal direction RL.

Therefore, a second curved area 68 or 69 (FIG. 8) lying further inward as viewed from the respective mounted end section 44 or 45, i.e., toward the rounded surface area 58, 59 (if deformation takes place), forms in the area 46 or 47 lying in front of the clamping device in proximity to the respective mounted end section. As the laminate is deformed (FIGS. 5 and 6) by the motion and exertion of a tensile stress by the clamping device, the end sections 22 of the parison 4 are fixed in place via one of the respective forming devices 14, 15 in such a way that the laminate layers 2*a*, 2*b*, and 2*c* at the laminate edge of the parison cannot slide onto each other, at least in the tensile direction.

Since the width B of the forming core 40 is greater viewed in a machining direction in this pre-deforming process than the width b of the tool mold 50 that is effective in this direction (FIG. 7), the leg length L exposed to the tensile stress between the respective edge 42, 43 and the arising curved area 68, 69 of the laminate 40 is greater than the leg length I of the parison laminate between the edges 42, 43 and the curved area 48, 49 formed on the tool mold 20 (see FIGS. 6 and 8). In particular the bending radii R of the forming core 40 can be designed in such a way as to correspond to the bending radii r of the tool mold 20.

The side of the retaining device 14, 15 facing the fitting 50 can be provided with a supporting surface 12 13, which can be rounded in particular on the side facing the laminate, and has a curvature axis running transverse to the tensile direction. In particular, this supporting surface can be provided with a corresponding design for conveying an applied tensile stress F to the parison 42 without impairing the latter. A correspondingly rounded supporting surface 12, 13 can also be provided for the purpose of imparting a curvature 48, 49 to the initial parison 2 during its formation, which can take place alternatively or additionally to the method according to FIG. 5, 6 using the deforming core or tool mold 20.

The end section can also be angled relative to the area lying next to the end section to form an initial parison by turning the first clamping device around an axis, at which the section of the laminate taken up by the first clamping device is angled in its longitudinal direction in relation to the area lying outside of the first clamping device and in front of it.

The curvature axis need not be straight during the formation of the initial parison, since the component can also be one that is curved in the longitudinal direction. The progression of the curvature axis during the formation of an initial parison must also not run parallel to the curvature axis of the laminate, which is provided in the course of deformation with the clamping device during exposure to the tensile force.

Further, the angle at which the end section and the area 46 or 47 lying inside are positioned relative to each other in the example shown on FIGS. 5 and 6 during the formation of the initial parison must not be equal when viewed in the longitudinal direction L to the angle at which a curved area lying further inward as viewed from the respective first curveted area 48 or 49 (the central area on FIG. 8) and the respective mounted end sections run relative to each other after continued forming of the laminate by means of the clamping devices and the fitting 50. However, this happens to be the case in the example shown on FIGS. 6 and 8, since in both the preparatory step and the procedural step performed with the clamping devices, a right angle is formed viewed in the longitudinal direction of the laminate. In this example, in particular the angle at which the edge section lying in the first clamping device is rotated in relation to the area of the laminate lying in front of the first clamping device can be identical within a margin of ±10 degrees to the angle at which the second lateral surface runs relative to the supporting surface.

The longitudinal direction RL is generally also the direction in which the clamping devices exert tensile stresses, wherein the longitudinal direction can arise in particular from the connecting line of the centers of the mounted end sections.

In the method, the end section can be angled in relation to the area lying next to the end section by means of a mold core.

In general, it can be provided that the laminate be additionally deformed, in particular while the laminate is being deformed by the clamping device during exposure to a tensile stress. For example, it can be provided that the supporting surface of the mold core be three-dimensionally deformed, and have elevations, ribbing, holes, ramps, etc. Such contour surfaces can also be provided on one or both lateral surfaces 34, 35. When the tensile stress acts on the laminate, the section of the latter running along such a supporting surface or one of the two such lateral surfaces is three-dimensionally deformed by contact pressure. If the supporting surface or one or both lateral surfaces is appropriately shaped, the layers of the laminate can here be at least regionally shifted relative to each other. In this way, stripped areas like back-cuts or even deformations in the laminate can be achieved.

The direction of the tensile stress F viewed transverse to the tensile stress preferably runs as precisely in the longitudinal direction of the laminate 40 as possible between the nearest to the respective clamping device that exerts the tensile stress F, or a supporting surface 12, 13 and a rounded surface area 58, 59.

In another embodiment, as the at least one clamping device 16, 17 or retaining device 14, 15 moves during exposure to a tensile stress, the path of motion 62, 63 can be adjusted in such a way that the laminate or the end section 44, 45 as a whole taken up by the clamping device 16, 17 slides in the clamping device and/or that layers within the end section 44, 45 slip toward each other. This is the case in particular if the progression of the supporting surface 12, 13 and/or the rounded section 58, 59 as well as the layer and motion of the respective clamping device 16, 17 relative thereto generate a displacement force of the laminate in relation to the clamping device that is directed transverse to the tensile stress.

The motion of the clamping devices or retaining devices takes place relative to the rounded section 58, 59, which imparts a curvature to the laminate area in front of the respective clamping device. Several rounded surface areas can here also be provided so as to form several curvatures on the laminate.

The motion of the retaining devices 14, 15 along the respective path of motion 61 or 62 can be controlled manually or automatically, e.g., by means of a CNC controller of an actuator (not shown). During this motion, the layers 2a, 2b, and 2c glide onto each other between the respective clamping device 14, 16 and the at least one rounded surface area 58, 59. The path of motion 61, 62 and the direction and magnitude of tensile stress F are here selected in such a way that the layers 2a, 2b, and 2c are exposed to a tensile stress, in particular during the motion of the at least one clamping device, so that layers or the laminate do not bulge or warp.

To this end, the manufacturing device has a mechanical gearing (not shown), which can be activated via the actuator (not shown), and is coupled to the one or more retaining devices 14, 15 or clamping devices 16, 17 according to the invention. The mechanical gearing is designed in such a way that the respective retaining device 14, 15 or clamping device 16, 17 can apply a predetermined tensile stress against the direction pointing to the second retaining device, and simultaneously execute a motion relative to the fitting retainer.

In addition, it can be provided that the mechanical gearing be coupled with a driving device, which can be activated via the actuator, and is coupled with the clamping device or retraining device, wherein the mechanical gearing and driving device are designed in such a way that the respective retaining device can apply a predetermined tensile stress against the direction pointing to the second retaining device, and simultaneously execute a motion relative to the fitting retainer. Each retaining device can be provided with its own mechanical gearing, or a single mechanical gearing can be provided for several retaining devices or clamping devices. In like manner, the driving device or actuator can each be coupled with several retaining devices or clamping devices. In particular, it can be provided that the actuator also activate the clamping device.

The motion performed by the mechanical gearing can here take place in a plane. The driving device can be suitable to apply a predetermined level of tensile stress on the laminate during the motion executed by the mechanical gearing. The tensile stress can be exerted in particular via a spring arrangement coupled with the driving device, which maintains a minimum tensile stress during the forming motion. The mechanical gearing can also be designed in such a way that the path of motion can be adjusted. The path of motion can here be arced. In addition, the first retaining device can have a rotational device, with which the first retaining device can be turned around an axis running transverse to the connection between the first and second retaining device. When several retaining devices are furnished, it can be provided that they be allocated rotational devices with rotational axes that do not run parallel to each other. The retaining device can be rotated with a rotational device in particular when implementing the path of motion 62, 63.

In order to configure the manufacturing device in such a way that the retaining device or clamping device exert a tensile stress according to the invention on the laminate, the driving device can be coupled with a spring arrangement, which applies the tensile stress, and the mechanical gearing can traverse the retaining device in such a way that the spring remains under tension while implementing the path of motion, thereby maintaining a minimum tensile stress in the forming process.

In particular, the mechanical gearing of the respective retaining device can be designed in such a way that the path of motion can be adjusted. It can be provided in particular that the manufacturing device be designed in such a way as to exert a tensile stress in the direction of the section lying bare in front of the respective clamping device or retaining device, while simultaneously implementing a prescribed path of motion. In general, the path of motion of the respective retaining device can be arced or paraboloid.

When two or more than two retaining devices 14, 15 are provided, the latter do not have to lie opposite each other in the manufacturing device. The manufacturing device can also have one or more additional clamping or mounting devices, which are not provided for implementing a path of motion 61, 62, i.e., are statically arranged in the manufacturing device.

In cases where one of the clamping devices is immovable or is not moved during a procedural step, this clamping device can also be realized via conventional mounting or fixing means.

The invention claimed is:

1. A method for manufacturing a fiber composite (FC) parison out of a laminate with a total of at least two dry fibrous tissue layers, which is held together with at least one of binders and prepreg layers, the method comprising the following steps:
   angling at least one of: (i) a first edge section of the laminate with respect to a central section of the laminate such that the first edge section extends transversely from the central section and a first curved section lies at a junction between such sections, which causes the layers to be offset in relation to one another, and (ii) an opposing second edge section of the laminate with respect to the central section such that the second edge section extends transversely from the central section and a second curved section lies between such sections and further causes the layers to be offset in relation to one another,
   mounting at least one of: (i) the first edge section of the laminate in a first clamping device and, (ii) the second edge section of the laminate in a second clamping device,
   providing a fitting having a central surface and at least one of: a first lateral surface extending transversely, from a first curved surface, away from the central surface, and an opposing second lateral surface extending transversely, from a first curved surface, away from the central surface,
   orienting the central section of the laminate over the central surface of the fitting such that the first edge section of the laminate is spaced away from the first lateral surface of the fitting and the first curved section is spaced away from the first curved surface of the fitting, and
   exerting a tensile stress to the laminate by moving at least one of the first clamping device and the second clamping device relative to the fitting in a predetermined direction, so that the first curved surface of the fitting imparts a first curvature to the central section of the laminate and the first curved section of the laminate is straightened,
   wherein clamping forces in the first and second clamping device are high enough to prevent the laminate layers from sliding relative to each other, thereby maintaining the offset layers within the laminate introduced by the angling step.

2. The method for manufacturing an FC parison of claim 1, wherein at least one of: the first clamping device is moved such that the laminate sectionally abuts the first lateral surface of the fitting, and (ii) the second clamping device is moved such that the laminate sectionally abuts the second lateral surface of the fitting.

3. The method for manufacturing an FC parison of claim 1, further comprising:
   applying the angling step to both the first and second edge sections of the laminate,
   orienting the central section of the laminate over the central surface of the fitting such that both: (i) the first edge section of the laminate is spaced away from the first lateral surface of the fitting and the first curved section is spaced away from the first curved surface of the fitting, and (ii) the second edge section of the laminate is spaced away from the second lateral surface of the fitting and the second curved section is spaced away from the second curved surface of the fitting, and
   exerting a tensile stress to the laminate by moving both the first clamping device and the second clamping device relative to one another such that both: (i) the first curved surface of the fitting imparts the first curvature to the central section of the laminate and the first curved section of the laminate is straightened, and (ii) the second curved surface of the fitting imparts the second curvature to the central section of the laminate and the second curved section of the laminate is straightened.

4. The method for manufacturing an FC parison of claim 1, wherein the at least one of the first and second edge sections are angled relative to the central section of the laminate by: (i) clamping the at least one of the first and second edge sections in the respective at least one of the first and second clamping devices using a relatively low clamping force that permits the layers within the laminate to move relative to one another; and (ii) at least one of: (a) turning the first clamping device around an axis at which the first edge section of the laminate is angled in its longitudinal direction relative to the central section thereby producing the first curved section and permitting the layers of the laminate to offset, and (b) turning the second clamping device around an axis at which the section edge section of the laminate is angled in its longitudinal direction relative to the central section thereby producing the second curved section and permitting the layers of the laminate to further offset.

5. The method for manufacturing an FC parison of claim 4, wherein the second clamping device is set in motion in a direction opposite the direction of motion of the first clamping device.

6. The method for manufacturing an FC parison of claim 5, wherein the motion of the second clamping device takes place simultaneously to the motion of the first clamping device.

7. The method for manufacturing an FC parison of claim 5, wherein the motion of the second clamping device encompasses a downward motion toward the second lateral surface of the fitting lying opposite the first lateral surface thereof and facing the second clamping device, until the laminate sectionally abuts the second lateral surface.

8. The method for manufacturing an FC parison of claim 4, wherein both of the first and second edge sections are angled relative to the central section of the laminate by: (i) clamping the at least one of the first and second edge sections in the respective at least one of the first and second clamping devices using a relatively low clamping force that permits the layers within the laminate to move relative to one another; (ii) turning the first clamping device around an axis at which the first edge section of the laminate is angled in its longitudinal direction relative to the central section thereby producing the first curved section and permitting the layers of the laminate to offset, and (iii) turning the second clamping device around an axis at which the section edge section of the laminate is angled in its longitudinal direction relative to the central section thereby producing the second curved section and permitting the layers of the laminate to further offset.

9. The method for manufacturing an FC parison of claim 8, wherein the length of at least one of the first edge section and the second edge section is so small that the layers of the respective end section shifts without warping an interior layer.

* * * * *